(12) United States Patent
Sanderovich et al.

(10) Patent No.: US 10,230,433 B2
(45) Date of Patent: Mar. 12, 2019

(54) TECHNIQUES FOR IMPROVING COVERAGE OF COMMUNICATION DEVICES

(71) Applicant: QUALCOMM Incorporated, San Diego, CA (US)

(72) Inventors: Amichai Sanderovich, Atlit (IL); Alon Yehezkely, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/809,927

(22) Filed: Jul. 27, 2015

(65) Prior Publication Data

US 2017/0033845 A1 Feb. 2, 2017

(51) Int. Cl.
*H04B 7/04* (2017.01)
*H04B 7/0413* (2017.01)
*H04B 7/08* (2006.01)

(52) U.S. Cl.
CPC ........... *H04B 7/0413* (2013.01); *H04B 7/082* (2013.01); *H04B 7/0808* (2013.01)

(58) Field of Classification Search
CPC ............. H04L 1/0054; H04L 25/03171; H04L 25/067; H04L 27/233
USPC .......................................... 375/324, 340–343
See application file for complete search history.

(56) References Cited

U.S. PATENT DOCUMENTS

| 7,924,930 | B1 | 4/2011 | Salhotra et al. | |
| 8,593,358 | B2 | 11/2013 | Rappaport | |
| 8,743,914 | B1 | 6/2014 | Jensen | |
| 2004/0012525 | A1 | 1/2004 | Yuda et al. | |
| 2006/0170565 | A1* | 8/2006 | Husak | G06K 7/0008 340/8.1 |
| 2013/0202062 | A1* | 8/2013 | Sadr | H04L 1/0054 375/324 |
| 2014/0044042 | A1 | 2/2014 | Moshfeghi | |
| 2014/0098912 | A1 | 4/2014 | Yin et al. | |
| 2014/0204928 | A1 | 7/2014 | Sorin | |
| 2014/0225804 | A1* | 8/2014 | Wild | G01S 3/48 343/876 |

(Continued)

FOREIGN PATENT DOCUMENTS

| GB | 2353673 A | 2/2001 |
| JP | 2014187461 A | 10/2014 |

(Continued)

OTHER PUBLICATIONS

Natarajan A., et al., "A Fully-Integrated 16-Element Phased-Array Receiver in SiGe BiCMOS for 60-GHz Communications," IEEE Journal of Solid-State Circuits, May 2011, vol. 46 (5), pp. 1059-1075.

(Continued)

*Primary Examiner* — David S Huang
(74) *Attorney, Agent, or Firm* — Patterson & Sheridan, L.L.P.

(57) ABSTRACT

Certain aspects of the present disclosure provide an apparatus for wireless communication. The apparatus may generally include a plurality of detectors, each configured to detect a signal received by at least one of a plurality of antenna arrays. The apparatus may further include a processing system configured to determine whether the signal is received by the at least one of the plurality of antenna arrays based on signals output from the plurality of detectors.

14 Claims, 5 Drawing Sheets

(56) References Cited

U.S. PATENT DOCUMENTS

2014/0355534 A1    12/2014  Vermani et al.
2015/0207551 A1*   7/2015   Kang .................. H04B 7/0608
                                                        375/296

FOREIGN PATENT DOCUMENTS

WO    WO-02058190 A1      7/2002
WO    WO-2014074894 A1    5/2014

OTHER PUBLICATIONS

Partial International Search Report—PCT/US2016/039735—ISA/EPO—Oct. 6, 2016.
International Search Report and Written Opinion—PCT/US2016/039735—ISA/EPO—Jan. 30, 2017.
Wei-Chang L., et al., "All-Digital Synchronization for SC/OFDM Mode of IEEE 802.15.3c and IEEE 802.11ad," IEEE Transactions on Circuits and Systems I: Regular Papers, IEEE, US, Feb. 1, 2015 (Feb. 1, 2015), vol. 62(2), pp. 545-553, XP011571617, ISSN: 1549-8328, DOI: 10.1109/TCSI.2014.2361035 [retrieved on Jan. 26, 2015.

* cited by examiner

TECHNIQUES FOR IMPROVING COVERAGE OF COMMUNICATION DEVICES

FIELD

Certain aspects of the present disclosure generally relate to wireless communications and, more particularly, to improving signal reception coverage.

BACKGROUND

To address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance such as higher throughput, greater reliability or both if the additional dimensionalities created by the multiple transmit and receive antennas are used.

SUMMARY

Certain aspects of the present disclosure provide an apparatus for wireless communication. The apparatus may generally include a plurality of detectors, each configured to detect a signal received by at least one of a plurality of antenna arrays; and a processing system configured to determine whether the signal is received by the apparatus based on outputs from the plurality of detectors.

Certain aspects of the present disclosure provide a method for wireless communication. The method generally includes receiving, via at least one of a plurality of antenna arrays, a signal; detecting the signal via at least one of a plurality of detectors; and determining whether the signal is received by the at least one of the plurality of antenna arrays based on outputs from the plurality of detectors.

Certain aspects of the present disclosure provide an apparatus for wireless communication. The apparatus generally includes means for receiving, via at least one of a plurality of antenna arrays, a signal; means for detecting the signal via at least one of a plurality of detectors; and means for determining whether the signal is received by the at least one of the plurality of antenna arrays based on outputs from the plurality of detectors.

Certain aspects of the present disclosure provide a computer readable medium comprising instructions that when executed cause an apparatus to: receive, via at least one of a plurality of antenna arrays, a signal; detect the signal via at least one of a plurality of detectors; and determine whether the signal is received by the at least one of the plurality of antenna arrays based on outputs from the plurality of detectors.

Certain aspects of the present disclosure provide a wireless node. The wireless node generally includes at least one antenna of a plurality of antennas configured to receive a signal; a plurality of detectors, each configured to detect the signal; and a processing system configured to determine whether the signal is received by the wireless node based on outputs from the plurality of detectors.

DETAILED DESCRIPTION

Figure 1:
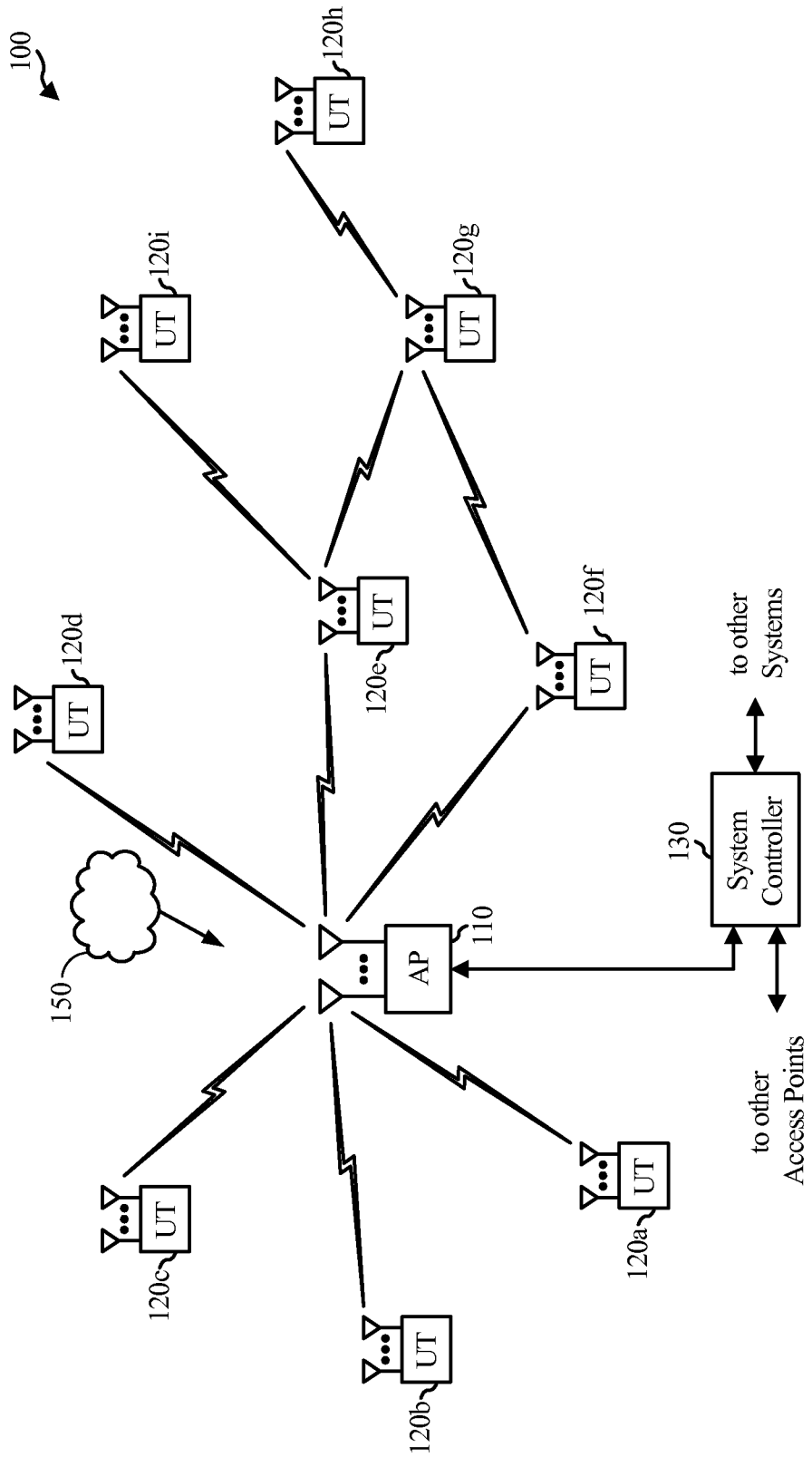
FIG. 1 is a diagram of an example wireless communications network, in accordance with certain aspects of the present disclosure.

Aspects of the present disclosure provide techniques and apparatus for improving signal reception coverage of a wireless node. For example, the wireless node may include a plurality of antenna arrays, each having a designated detector for detecting signals received by the antenna arrays. By including designated detectors, noise at the input of each detector may be reduced, resulting in increased signal reception coverage.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may use sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system uses orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may use interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 may couple to and provide coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also use a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
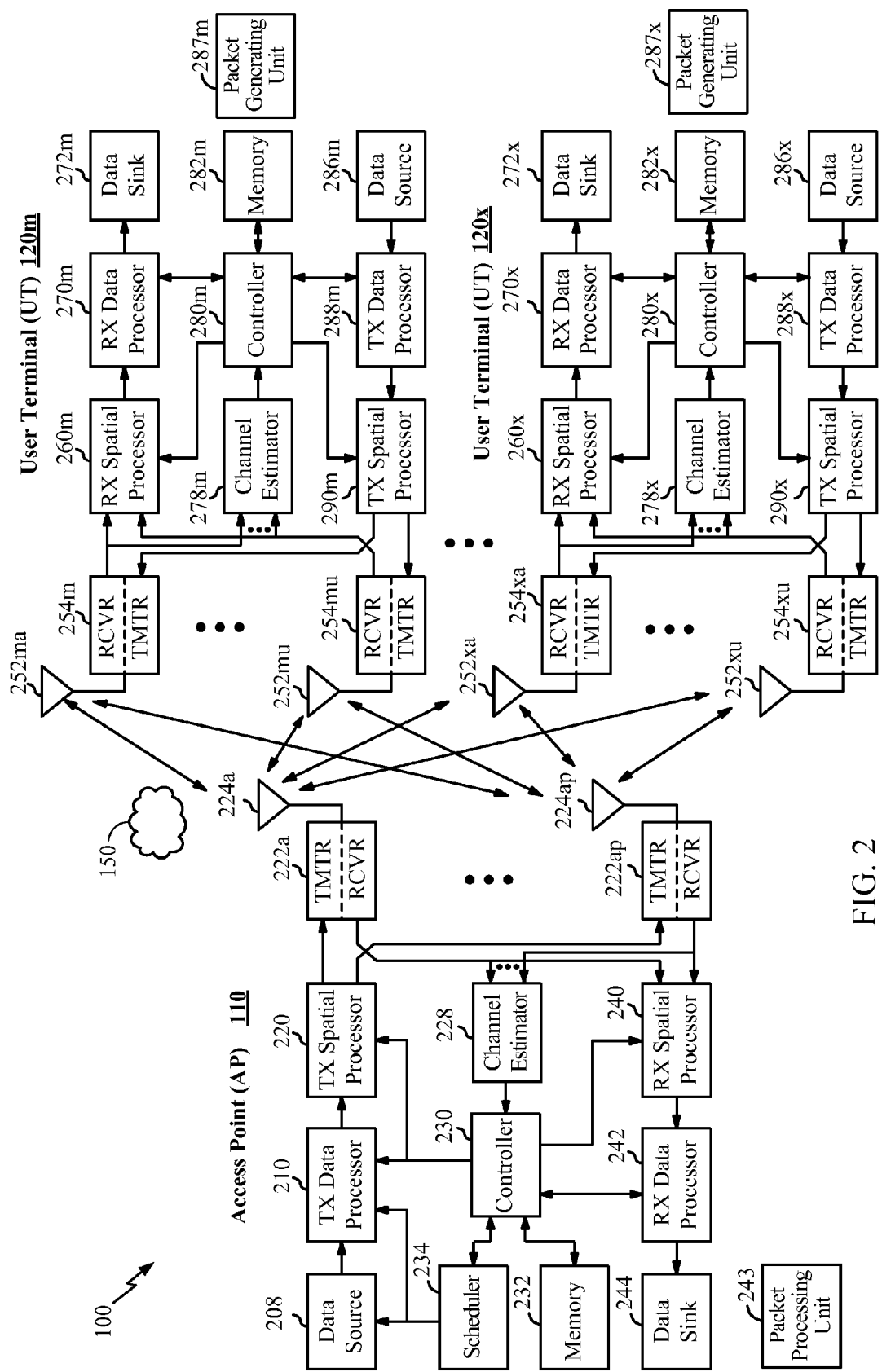
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, Nup user terminals simultaneously transmit on the uplink, while Ndn user terminals are simultaneously transmitted to on the downlink by the access point 110. Nup may or may not be equal to Ndn, and Nup and Ndn may be static values or can change for each scheduling interval. The beamsteering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Example Techniques to Improve Signal Reception Coverage

In certain systems such as IEEE 802.11ad and mmWave type systems, one device may use high sensitivity transmission/reception mode, which may be referred to as a "control PHY" mode, in order to reach or connect to another device whose receive antennas are not yet trained. In this high sensitivity transmission mode, a transmitting device may transmit physical layer (PHY) frames at a low data rate supported by each of the devices operating in the system, in order to communicate basic control information related to, e.g., beamforming training.

A receiver operating in this mode typically operates in an "omni" mode, where its antennas are configured such that they can receive signals from all directions. That is, prior to beamforming training, a device may not know the direction from which a signal may be received and, thus, may be configured to receive signals from all directions. Some such receivers may use a single receive chain or multiple receive chains. In general, a receive chain refers to a set of components used to process and detect an RF signal received via one or more antennas.

When using a single receive chain with a single detector in an omni mode of operation, coverage of the device may be determined by the sensitivity of the receive chain and the particular antenna configuration, as opposed to a link-budget of a trained link. Therefore, even though the control PHY mode of transmission may use a low transmission rate, e.g., 23 megabits per second (mbps), poor signal-to-noise ratio (SNR) for signals received from certain directions may result in poor coverage.

Some devices may include a plurality of omni elements in an antenna array arranged to receive signals omni-directionally. A single receive chain with a single detector circuit may not have sufficient sensitivity for this configuration. For example, a sensitivity for a single receive chain with a single detector circuit may be 15 dB below the sensitivity that may be needed for a device to operate the control PHY mode.

Figure 3:
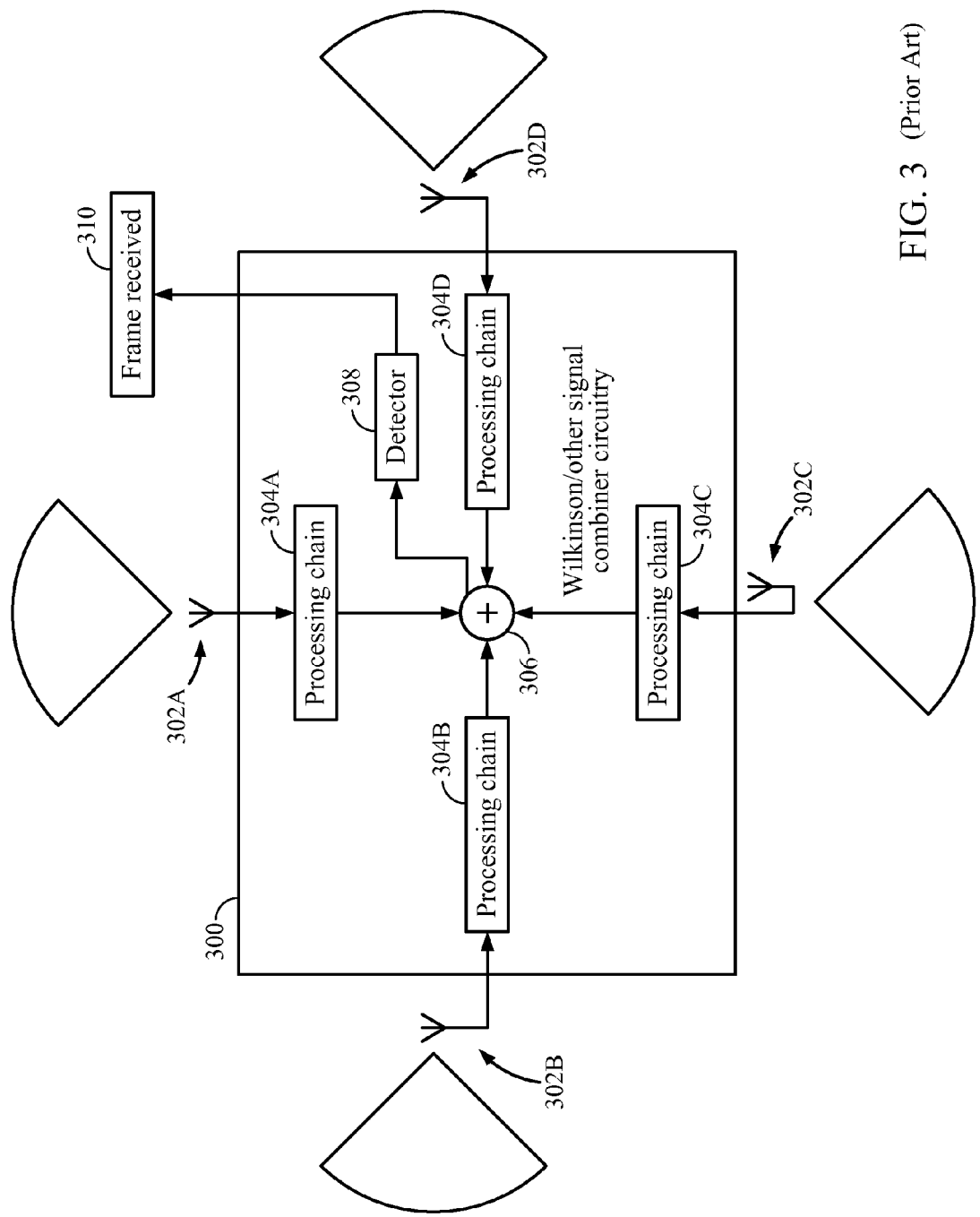
FIG. 3 is a block diagram of an example device with a single detector configured to detect a signal received from a plurality of antenna arrays.

FIG. 3 illustrates an example of such a device 300 with a single detector. In this example, device 300 has four antennas 302A, 302B, 302C, 302D (collectively, 302), each configured to receive signals from one of a plurality of directions. The signals received by each of the antennas 302 are processed by respective processing chains 304A, 304B, 304C, and 304D (collectively, processing chains 304). The output of each of the processing chains 304 are combined via a combiner circuit 306 (e.g., a Wilkinson combiner) to generate a single input to a single detector 308 which, for example, may include a mixer and an analog-to-digital converter (ADC). The detector is configured to detect a signal, which may be received by one of the plurality of antennas 302 and, e.g., from one of a plurality of directions. Based on an output of the detector, a processing system may determine whether a frame 310 is received by at least one of the antennas 302.

In this configuration, noise from each of the plurality of antennas is added to the combined signal that is input to the detector 308. Therefore, by having a single detector 308 that receives a combined output of the plurality of processing chains, a noise floor of the input to the detector is increased (e.g., by 6 dB), thus resulting in a reduction in coverage (e.g., by 6 dB) as compared to device 500 of FIG. 5, described in more detail below.

For example, a device may include three antenna arrays, a first antenna array oriented according to a vertical polarization, a second oriented according to a horizontal polarization, and a third oriented according to the side of the receiving device. As noted above, however, the device may have a receive chain with a single detector used for all of such arrays, which may make it difficult to actually detect direction of a received signal. By including multiple detectors in a receiving device, however, signal reception coverage of a device may be increased by, e.g., taking advantage of antenna gain of multiple antenna arrays. As an example, assuming the same three-array configuration discussed above, three different detectors may be used to detect signals received by each of the antenna arrays. This arrangement may decrease sensitivity required for detection (e.g., by 5 dB), and increase coverage.

Aspects of the present disclosure provide techniques and apparatuses that use multiple receive chains/detectors within the same receiving device. This allows the signal reception sensitivity of the receiving device to be lowered by effectively combining antenna gain for each of the receive chains. In other words, rather than rely on a single receive chain/detector, the device may benefit from receive diversity by relying on multiple receive chains/detectors. In this manner, aspects of the present disclosure provide techniques and apparatus for improving the coverage of omni mode signal reception by including a designated detector for each of a plurality of processing chains and antennas.

Figure 4:
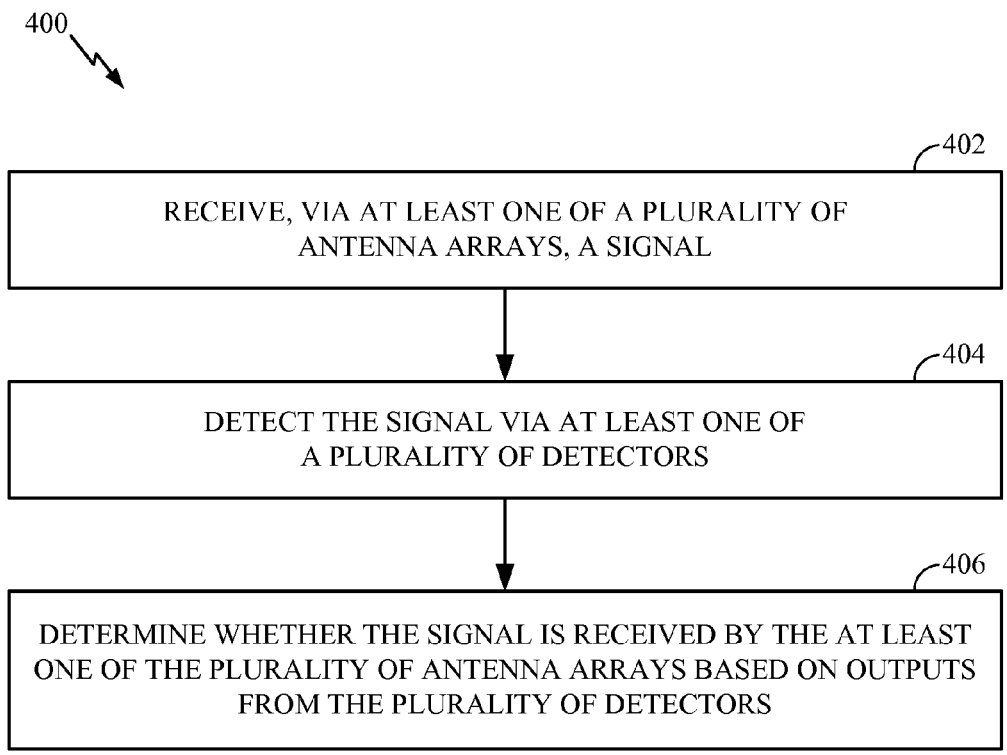
FIG. 4 illustrates example operations for detecting a signal using a plurality of detectors, in accordance with certain aspects of the present disclosure.

FIG. 4 illustrates example operations 400 for wireless communication, in accordance with certain aspects of the present disclosure. The operations 400 may be performed, for example, by a wireless node that has multiple detectors.

The operations 400 begin, at 402, by receiving, via at least one of a plurality of antenna arrays, a signal. At 404, the wireless node detects the signal via at least one of a plurality of detectors and, at 406, determines whether the signal is received by the at least one of the plurality of antenna arrays based on outputs from the plurality of detectors. In certain aspects, the signal may be a known signal. That is, the signal may be predetermined by a processing system of the device 300 and the plurality of detectors may be configured to monitor for and detect the known signal.

Figure 4A:
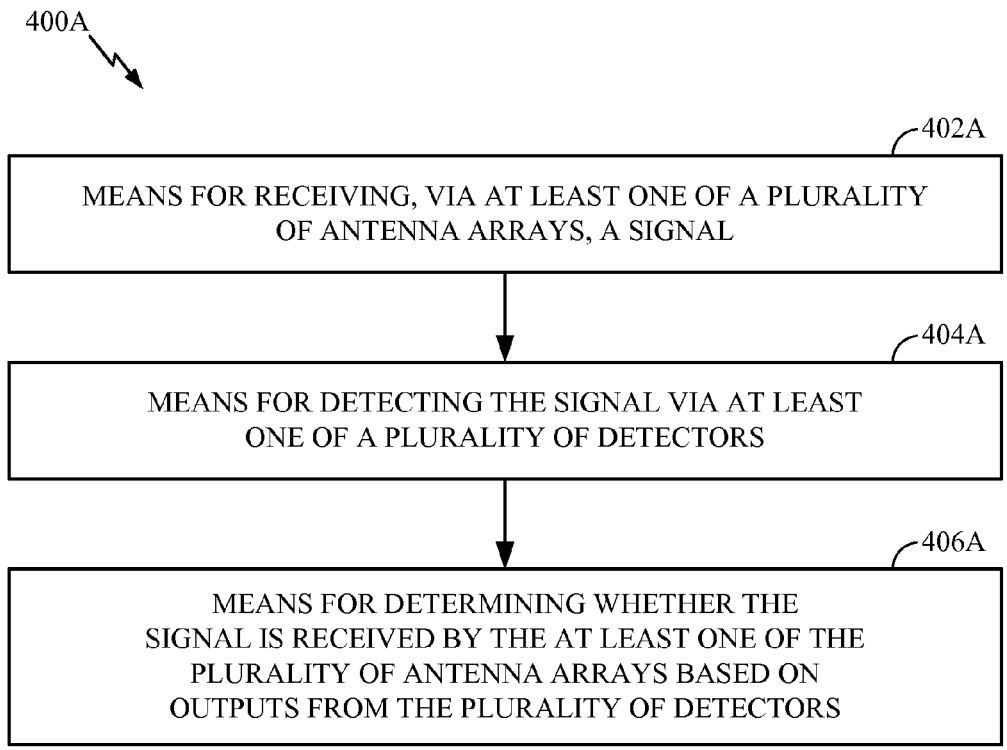
FIG. 4A illustrates example components capable of performing the operations of FIG. 4, in accordance with certain aspects of the present disclosure.

The operations 400 have corresponding counterpart means-plus-function components. For example, operations 400 illustrated in FIG. 4 may correspond to means 400A illustrated in FIG. 4A. Means for receiving at 402A may be a plurality of antenna arrays and/or processing chains, which may be configured to receive a signal. Means for detecting at 404A may be at least one of a plurality of detectors, which may be configured to monitor for, and detect a signal. For example, the means for detecting may detect the signal by comparing an energy level of a received signal with a threshold to determine whether the signal is received. Means for determining at 406A may be performed by a processing system which may be configured to determine whether the signal has been detected by at least one of the plurality of detectors, based on outputs from the plurality of detectors. The wireless node carrying out these operations is described in more detail with respect to FIG. 5.

Figure 5:
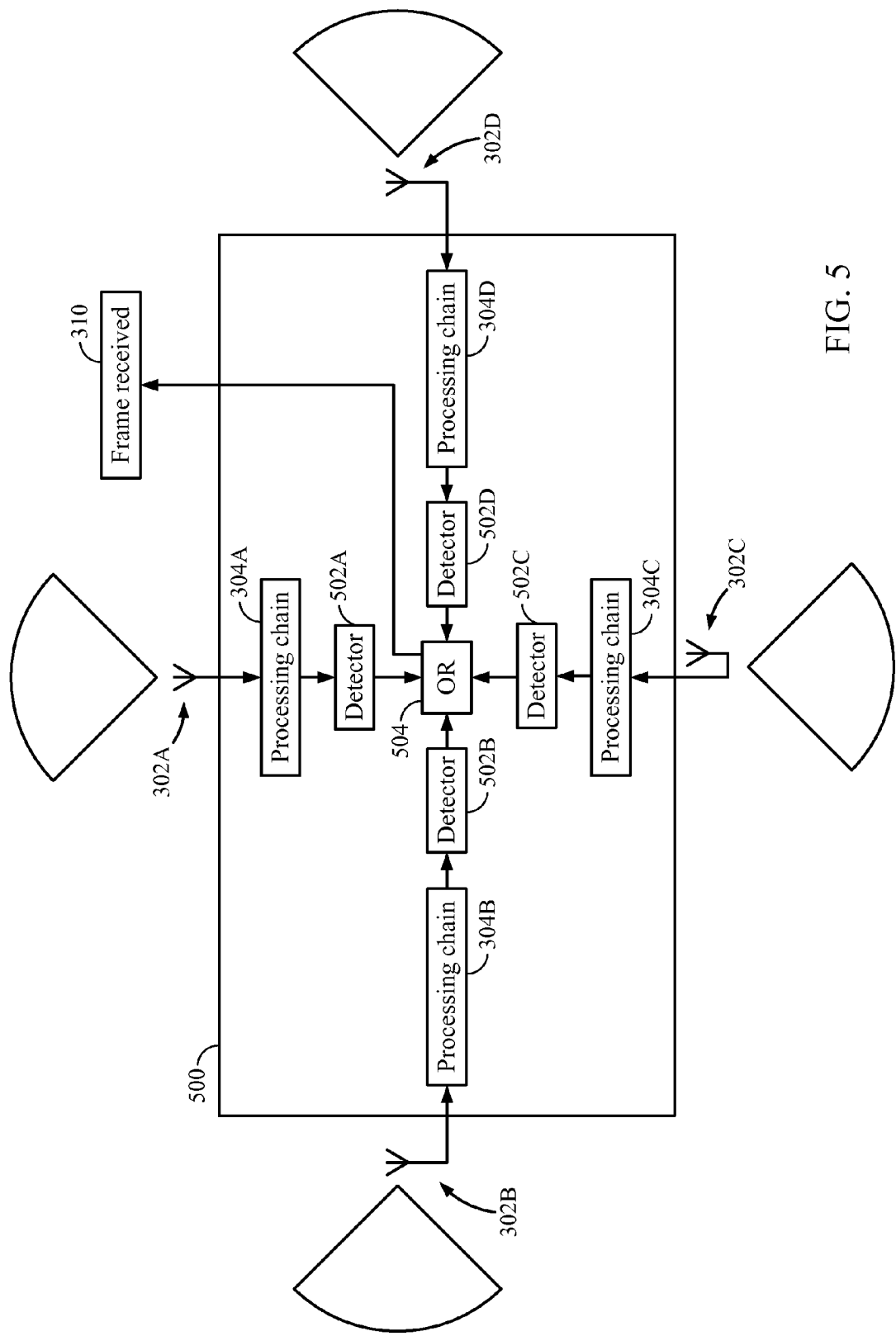
FIG. 5 is a block diagram of an example wireless node configured to detect a signal using a plurality of detectors, in accordance with certain aspects of the present disclosure.

FIG. 5 is a block diagram of a device 500 having a plurality of detectors 502A, 502B, 502C, 502D (collectively, detectors 502), each configured to detect a signal (e.g., a control PHY preamble) received by a respective one of a plurality of antenna arrays 302, in accordance with certain aspects of the present disclosure. That is, a signal received by at least one of the plurality of antenna arrays 302 may be processed via a respective processing chain (e.g., one of the plurality of processing chains 304), and detected by a respective one of the plurality of detectors 502. The outputs of the detectors 502 may be combined (e.g., a logic OR operation via logic gate 504) and a processing system of the device may use the combined signal to determine whether a frame 310 has been received. For example, the processing system may monitor and determine when the output of the logic gate 504 indicates a logic high. Based on this determination, the processing system can determine that one of the plurality of detectors 502 have detected the frame 310, and thus, the frame 310 has been received.

In certain aspects, each of the detectors 502 may be coupled to a different antenna array of the plurality of antenna arrays 302. In other aspects, each of the detectors 502 may be coupled to a different antenna within one of the plurality of antenna arrays 302. In certain aspects, each of the detectors 502 may be coupled to a plurality of antennas of a respective antenna array through a combiner, where each detector is fed with a different combination of the plurality of antennas, including different gain and/or phase per antenna.

By using at least one detector for each of the antenna arrays 302, noise on the input of each detector may be lower as compared to the device 300 of FIG. 3. Moreover, the signal received by each detector may not impact signals received by the other detectors, since the antenna arrays do not have any significant overlap. In some cases, a significant improvement in coverage (e.g., a 6 dB improvement) may be obtained using the configuration shown in FIG. 5 as compared to the device 300 of FIG. 3.

According certain aspects of the present disclosure, a processing system of device 500 may be configured to determine a direction (e.g., sector) from which a signal, including frame 310 for example, was transmitted by another device based on the outputs of the plurality of detectors 502. For example, if a signal is more strongly detected by detector 502A, the processing system may determine that the detected signal was received from a direction (e.g., sector) corresponding to the detector 502A. In certain aspects, the processing system of device 500 may be configured to determine a polarization of a signal, including frame 310 for example, based on outputs of the plurality of detectors 502. For example, each detector, of the plurality of detectors 502, may be configured to detect a different polarization of the received signal. Therefore, if a signal is detected by a detector (e.g., detector 502A) that is configured to detect a vertical polarization, then the processing system may determine that the received signal has been received with a vertical polarization. In certain aspects, the polarization is used to configure the antennas for further communication with an apparatus that transmitted the signal, e.g., including frame 310. For example, the processing system may adjust one or more transmission parameters for communication with the other apparatus based on the determined polarization. In certain aspects, each detector may determine whether the known signal is received by comparing an energy level of the received signal with a threshold.

In certain aspects, a device may be configured to communicate with the other device that transmitted the signal, e.g., including frame 310, based on the determined direction. For example, the device may update beamforming parameters to optimize communications in the determined direction. For example, the device may control the directionality of signal transmission and reception by configuring transmitting and/or receiving antennas such as adjusting beamforming weights of at least one of the plurality of antenna arrays 302 based on the determined direction.

In certain aspects, each of the detectors 502 may be part of one of a plurality of RF modules. In such cases, device 500 may include the plurality of RF modules, each being configured to down convert a signal received by a corresponding one of the antenna arrays to a baseband signal.

In certain aspects, each of the detectors 502 may be configured to detect a particular type of known signal transmitted by another device. For example, each detector may be configured to detect Golay sequence known by the device 500. In this case, the Golay sequence may be detected based on a comparison of a Golay cross-correlation of the Golay sequence with a threshold. In certain aspects, the Golay cross-correlation of the Golay sequence may be performed by a Golay correlator of the device 500. In some cases, each detector may be configured to detect cyclic repetition signals. In this case, the cyclic repetition signal may be detected by comparing an auto-correlation of the known signal with a threshold. In certain aspects, a processing system of the device 500 may normalize the threshold based on a receive energy level of the known signal.

As described herein, by utilizing multiple detectors, aspects of the present disclosure may allow gain of multiple antenna arrays to effectively be combined when detecting a received signal, which may help increase sensitivity, improve the accuracy of determining a particular direction, and improve overall performance.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 may correspond to means 400A illustrated in FIG. 4A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for adjusting, means for generating, means for using, means for normalizing, means for comparing, means for performing frequency offset adjustment, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2. Means for detecting may comprise a detector (e.g., detectors 502) as illustrated in FIG. 5. Means for combining, and means for coupling, may comprise a combiner or a logic gate (e.g., an logic gate 504) as illustrated in FIG. 5. Means for down converting may comprise an RF module.

According to certain aspects, such means may be implemented by processing systems configured to perform the corresponding functions by implementing various algorithms (e.g., in hardware or by executing software instructions) described above.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer readable storage medium with instructions stored thereon separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
    a plurality of detectors, each configured to detect a signal received by at least one of a plurality of antenna arrays, wherein the signal is received from another apparatus; and
    a processing system configured to:
        determine that the signal is received by the apparatus by combining outputs from the plurality of detectors using a logical operation;
        determine a receive direction of the signal based on output of one or more detectors of the plurality of detectors; and
        adjust one or more transmission parameters for communication with the other apparatus based on the receive direction.

2. The apparatus of claim 1, further comprising a plurality of receive processing chains, wherein at least one of the receive processing chains is configured to process the signal received by a corresponding one of the antenna arrays, and provide an input to a corresponding one of the detectors.

3. The apparatus of claim 1, wherein:
    at least one of the antenna arrays is configured to use the receive direction for future communication with the other apparatus.

4. The apparatus of claim 1, further comprising a plurality of RF modules, each being configured to down convert a signal received by a corresponding one of the antenna arrays to a baseband signal, wherein each detector is part of one of the plurality of RF modules.

5. The apparatus of claim 1, wherein the received signal is a cyclic repetition signal, and wherein each detector of the plurality of detectors is configured to detect the cyclic repetition signal by comparing an auto-correlation of the signal with a threshold.

6. The apparatus of claim 1, wherein each detector of the plurality of detectors is configured to detect the signal by comparing an energy level of the received signal with a threshold.

7. The apparatus of claim 1, wherein each detector of the plurality of detectors is coupled to a different antenna array of the plurality of antenna arrays.

8. The apparatus of claim 1, wherein each detector of the plurality of detectors is coupled to a different antenna within one of the plurality of antenna arrays.

9. The apparatus of claim 1 further comprising a plurality of combiners, each combiner coupling each detector of the plurality of detectors to a plurality of antennas of a respective antenna array of the plurality of antenna arrays.

10. The apparatus of claim 1, further comprising the plurality of antenna arrays, wherein the apparatus is configured as a wireless node.

11. An apparatus for wireless communication, comprising:
    a plurality of detectors, each configured to detect a signal received by at least one of a plurality of antenna arrays; and
    a processing system configured to determine that the signal is received by the apparatus based on outputs from the plurality of detectors, wherein the signal comprises a Golay sequence, and wherein each detector of the plurality of detectors is configured to detect the Golay sequence by comparing a Golay cross-correlation of the Golay sequence with a threshold, and wherein the processing system is configured to normalize the threshold based on a receive energy level of the received signal.

12. The apparatus of claim 11, further comprising the plurality of antenna arrays, wherein the apparatus is configured as a wireless node.

13. An apparatus for wireless communication, comprising:
- a plurality of detectors, each configured to detect a signal received, from another apparatus, by at least one of a plurality of antenna arrays; and
- a processing system configured to determine that the signal is received by the apparatus based on outputs from the plurality of detectors, wherein the processing system is configured to determine a polarization of the received signal based on outputs of the plurality of detectors,
- wherein the processing system is configured to adjust, based on the polarization, one or more transmission parameters for future communication to the other apparatus.

14. The apparatus of claim 13, further comprising the plurality of antenna arrays, wherein the apparatus is configured as a wireless node.

\* \* \* \* \*